Feb. 26, 1952 W. STELZER 2,587,403
FLUID PRESSURE OPERATED MOTOR
Filed March 22, 1945 2 SHEETS—SHEET 2

Inventor
WILLIAM STELZER
By
Attorney

Patented Feb. 26, 1952

2,587,403

UNITED STATES PATENT OFFICE 2,587,403

FLUID PRESSURE OPERATED MOTOR

William Stelzer, Richmond, Va.

Application March 22, 1945, Serial No. 584,204

7 Claims. (Cl. 121—41)

This invention relates to fluid pressure operated motors, and more particularly to a booster motor for hydraulic vehicle brake systems.

There are now in common use booster brake mechanisms for hydraulic brake systems wherein the operation of the vehicle brake pedal displaces fluid from the master cylinder into the booster mechanism to displace fluid from a high pressure cylinder into the wheel cylinders and to effect operation of a motor which also displaces fluid from the high pressure cylinder to thus generate a substantially higher effective braking pressure than can be accomplished by the foot of the operator, or with much less effort on the part of the operator.

Booster mechanisms of the character referred to are efficient in operation and are wholly satisfactory on light and medium weight vehicles. However, a booster motor of this type cannot be made practicable for the braking systems of heavy vehicles since the motors cannot be made sufficiently large in diameter to generate the necessary pressures in the brake lines. To overcome this difficulty, it has been proposed to employ a compound motor which is, in effect, two motors in end to end relation each adding its power to the other motor to effect the generation of sufficient pressure in the brake lines to adapt the mechanism for use on heavy vehicles. Compound booster motors, however, are of two types and each is open to objections. For example, it is either necessary to employ separate control valve mechanisms for each motor unit, or to provide external piping connections for controlling both motors from the same valve mechanism. The first type is objectionable for the reason that it complicates the mechanism and substantially increases its cost. The second type of mechanism is objectionable since external piping connections are subject to damage in several ways, for example, by rocks thrown against the mechanism when the vehicle is traveling over a highway.

An important object of the present invention is to provide a novel compound booster brake mechanism wherein a single valve mechanism controls both motor units and wherein external pipe for such purpose is completely eliminated, the mechanism involving only the three essential pipe connections, namely, to the master cylinder, to the brake cylinders and to the intake manifold as the source of pressure differential.

A further object is to provide such an apparatus wherein the motor structure is almost perfectly cylindrical from end to end and is completely devoid of any elements extending radially beyond the limits of the booster motor, except for the single connection to the intake manifold.

A further object is to provide a compound booster structure having what may be termed main and auxiliary motor units, and employing novel means whereby the pressure chambers of the auxiliary unit are subjected to the respective pressures in the chambers of the main unit to operate simultaneously therewith and to add its power to that generated by the main motor unit.

A further object is to provide such an apparatus wherein each pressure chamber of the auxiliary motor is in fixed communication with the corresponding chamber of the main motor unit, and wherein such communication is maintained wholly internally of the motor without the use of any external piping connections.

Other objects and advantages of the invention will become apparent during the course of the following description.

In the drawings I have shown one embodiment of the invention. In this showing:

Figure 1:
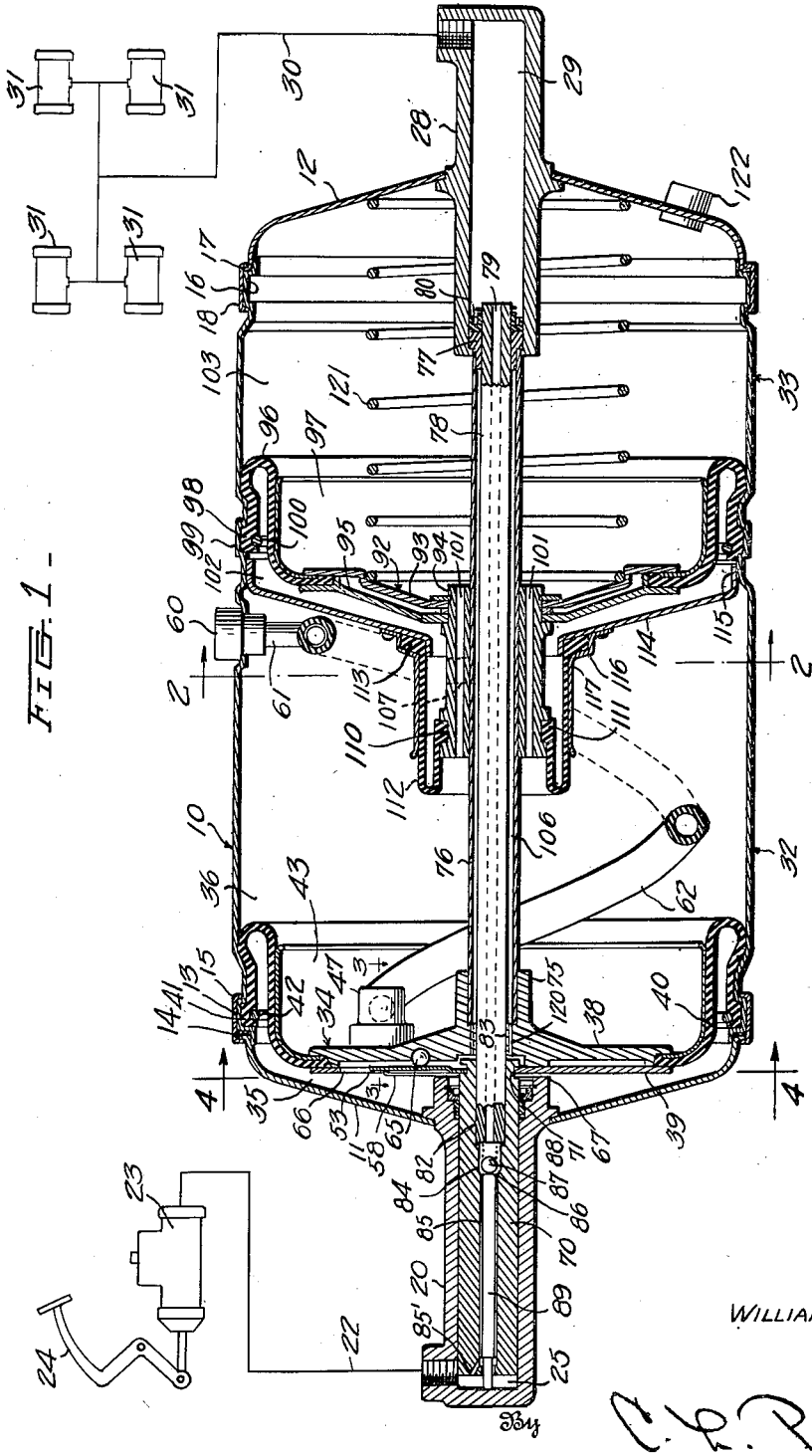
Figure 1 is a central longitudinal sectional view through the booster unit.

Referring to Figure 1, the numeral 10 designates a motor casing which is generally cylindrical from end to end and is provided at opposite ends with heads 11 and 12. At the end of the casing 10 adjacent the head 11, the former is provided with a relatively wide rolled bead 13 adjacent one end of which is arranged an annular flange 14 carried by the head 11, and a band 15 has its ends rolled to engage the flange 14 and the opposite end of the bead 13 to secure the head 11 to the cylindrical casing 10. The opposite end of the casing 10 is provided with a similar bead 16 adjacent which is arranged a flange 17 formed on the head 12 and a band 18, similar to the band 15, has its edges rolled inwardly to clamp the flange 17 and bead 16 relative to each other to secure the head 12 to the casing 10.

An axial cylinder 20 is secured to the head 11 and projects a substantial distance outwardly therefrom. The left hand end of the cylinder 20 communicates through a pipe line 22 with the vehicle master cylinder indicated as a whole by the numeral 23 and having the usual piston (not shown), operable by a conventional brake pedal 24. Brake fluid accordingly will be displaced into the left hand end of the cylinder 20 forming a low pressure chamber 25. In a manner to be described, hydraulic braking pressure is adapted to be generated in an axial cylinder 28 carried by the cylinder head 12 and having therein a high pressure chamber 29 communicating through suitable piping 30 with the wheel cylinders 31 of the vehicle.

The casing 10 contains the elements of two motor units which may, for the purpose of convenience, be referred to as the main and auxiliary motor units and generally designated by the numerals 32 and 33. The motor unit 32 comprises a pressure responsive unit indicated as a whole by the numeral 34 and dividing the motor 32 into pressure chambers 35 and 36. The unit 34 comprises a diaphragm plate 38 against which is arranged a clamping plate 39 for securing in position the inner periphery of a flexible diaphragm 40 formed of any suitable material. The outer periphery of the diaphragm 40 is formed as a bead 41 arranged in the interior of the casing bead 13 and secured in position by a relatively heavy snap ring 42. The plates 38 and 39 also serve to clamp in position a diaphragm supporting cup 43. This cup is shaped in cross-section as shown in Figure 1 and serves to support the diaphragm 42 in position to prevent any sagging thereof, thereby holding the diaphragm centered and in proper cross-sectional shape, as is desired.

In a manner to be described the chamber 36 is in constant communication with a source of relatively low pressure, preferably sub-atmospheric pressure, and the source of such pressure is conveniently the intake manifold of the vehicle engine. The chamber 36 is normally in communication with the chamber 35 through a port 45 (Figure 3) adapted to be closed by any suitable type of valve, for example, the ball valve 46. For controlling the admission of pressure from a source of higher pressure, such as the atmosphere, the diaphragm plate 38 is provided with a boss 47 having an atmospheric chamber 48 therein communicating with the chamber 35 through a valve seat 49 normally engaged by a valve 50.

A lever plate 53 is adapted to operate the valves 46 and 50. This plate directly engages the valve 50 and a stem 54 carried by the valve 46 extends through the plate 53 and is provided with an adjusting nut 55 and a jamb nut 56. A small convolute spring 57 is arranged between the plate 53 and the valve 46. It will become apparent that in the operation of the device, the portion of the plate 53 shown in Figure 3 will move toward the left in such figure to first close the valve 46 and then open the valve 50 to connect the chamber 35 to the source of atmospheric pressure and thus energize the motor 32. To insure the proper sequence of operation of the valves, a spring 58 has one end engaging the plate 53 and its other end anchored to the plate 39, this spring urging the valve 50 to closed position and normally holding it in such position.

Figure 2:
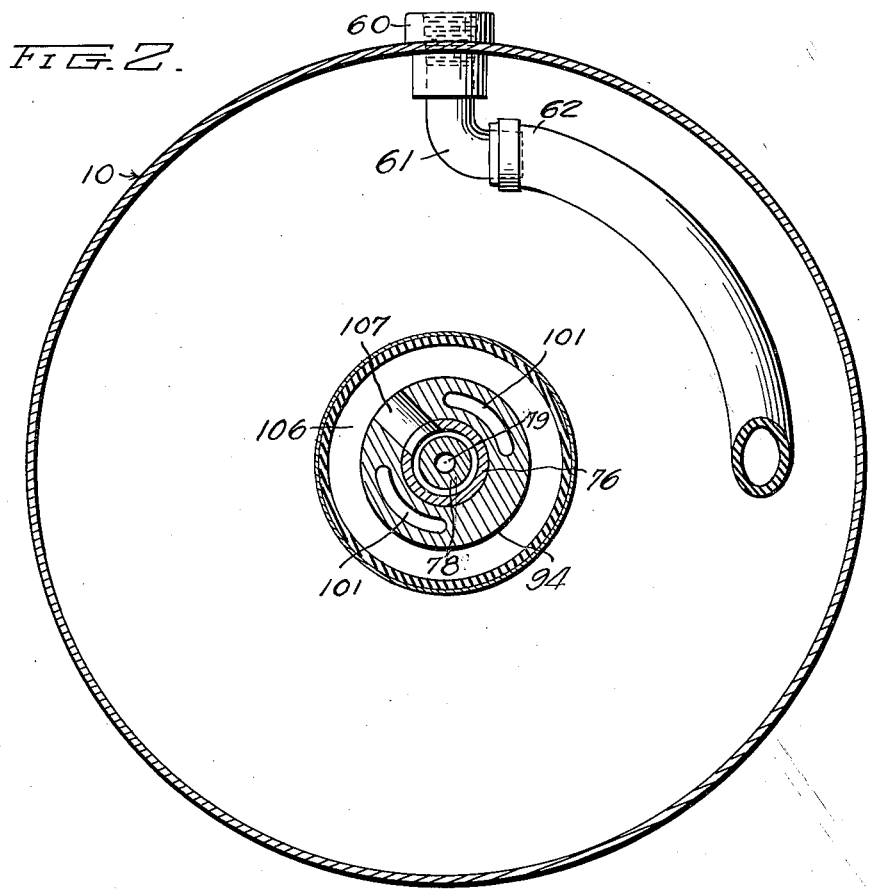
Figure 2 is a transverse sectional view on line 2—2 of Figure 1.
Figure 4:
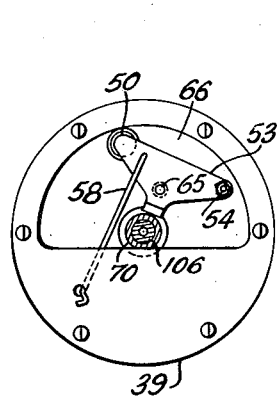
Figure 4 is a detail sectional view on line 4—4 of Figure 1, the casing and other elements being omitted.

As shown in Figures 1 and 2, the casing 10 is provided with a fitting 60 which may be connected externally of the casing 10 to an air cleaner, the fitting 60 in any event communicating with the atmosphere in the embodiment of the invention illustrated. Internally of the casing 10, the fitting 60 is provided with an elbow 61 to which is connected one end of a spiral section of flexible hose 62. The other end of this hose (Figure 3) is connected to a nipple 63 carried by the boss 47 to connect the chamber 48 to the hose 62. Through the hose 62 the chamber 48 obviously is in constant communication with the atmosphere.

The lever plate 53 (Figure 1) is engageable with a ball 65 carried by the diaphragm plate 38 to act as a universal fulcrum for the lever plate. The lever plate 53 is arranged within an opening 66 formed in the clamping plate 39 and the latter element, in addition to clamping the diaphragm 40 in position, forms a stop plate to limit movement of the pressure responsive unit 34 to the left by engaging the inner end 67 of the cylinder 20.

A piston 70 is mounted to reciprocate in the cylinder 20 and has limited movement relative to the pressure responsive unit 34. For this purpose, and for another purpose to be referred to, the piston 70 is provided with a groove 71 receiving the portion of the plate 39 at the bottom of the opening 66 therein. In the event of a failure of power in the motor structure, manual movement of the piston 70 will be transmitted to the pressure responsive unit 34 by engagement of the left hand wall of the groove 71 with the plate 39. The groove 71 also receives the lower end of the lever plate 53, and accordingly movement of the piston 70 toward the right in Figure 1 will rock the lever plate 53 about the ball 65 to effect the valve-operating movement of the lever 53 referred to above.

The diaphragm plate 38 is provided with an axial boss 75 in which is secured one end of a tubular piston rod 76. At its other end, this piston rod is fixed to a plunger 77 reciprocable in the cylinder 28. A piston rod 78 is arranged in the piston sleeve 76 and has an axial passage 79 extending throughout its length. One end of the piston rod 78 is slidable in the plunger 77 and projects into the cylinder 28, and the rod 78 and plunger 77 are provided with a seal 80 to prevent leakage therebetween and to prevent leakage past the outside of the plunger 77.

The other end of the piston rod 78 fits into an axial bore 82 formed in the piston 70, and the adjacent portion of the piston rod 78 is slidable in an axial opening 83 formed in the diaphragm plate 38. The bore 82 communicates with a slightly smaller bore 84 in the piston 70, which in turn, communicates with a somewhat smaller bore 85, the bores 84 and 85 communicating through a valve seat 86 engageable by a ball valve 87 urged to closed position by a spring 88.

The bore 85 communicates with the chamber 25 through a passage 85¹. A rod 89 loosely arranged in the bore 85 has one end engageable with the valve 87, and has its other end engageable with the other end of the cylinder 20 when the parts are in the "off" position shown in Figure 1, the rod 89 thereby maintaining the ball 87 unseated for a purpose to be described.

The motor unit 33 comprises a pressure responsive unit 92 formed of a diaphragm plate 93 mounted on a relatively heavy hub 94 and the same hub carries a pressed metal plate 95 serving to secure to the diaphragm plate the inner periphery of a diaphragm 96. A pressed metal cup 97 is carried by the diaphragm plate 93 and serves to position the inner portion of the diaphragm 96 when the parts of the apparatus are in their "off" positions. At its outer periphery, the diaphragm 96 carries a bead 98 arranged in the internal groove formed by a bead 99 rolled in the casing 10, and a relatively heavy snap ring 100 serves to anchor the bead 98 in position.

The hub 94 has one or more passages 101 (Figure 2) extending axially therethrough, as shown in Figures 1 and 2. The pressure-responsive unit 92 divides the motor unit 33 into pressure chambers 102 and 103 and the latter chamber corresponds to the motor chamber 36 and is in fixed communication therewith through the passages 101. Accordingly, any pressures present in the motor chambers 36 will be exactly duplicated in the motor chamber 103.

It will be noted that the piston sleeve 76 is larger in diameter than the piston rod 78, thus forming therewith an elongated axial passage 106. This passage communicates with the motor chamber 102 through a radial port 107 (Figure 2) extending through the hub 94 and piston sleeve 76.

One of the most important features of the construction lies in the means for sealing the motor chamber 36, in which comparatively constant pressure is maintained from the motor chamber 102, in which the pressure substantially varies in accordance with the energization of the booster motor. Adjacent its left hand end, as viewed in Figure 1, the hub 94 is provided with a groove 110 receiving a bead 111 formed at one end of a telescoping elongated seal 112. This seal doubles back upon itself, as shown in Figure 1, and is provided at its other end with a relatively heavy bead 113 seated on the inner peripheral portion of a wall 114 forming a common head between the motor units 32 and 33. The wall 114 has a cylindrical circumferential flange 115 welded or otherwise secured to the casing structure 10. The bead 113 is secured in position against the wall 114 by a clamping ring 116 having a cylindrical axially extending sleeve 117 surrounding the outer bend of the seal 112 to support and position such element.

It will be apparent that the seal 112 effectively closes communication between the chambers 36 and 102, and since the port 107 (Figure 2) is arranged within the seal 112, the motor chamber 102 obviously is in fixed communication with the annular passage 106. Such passage, in turn, is in fixed communication with the motor chamber 35 through ports 120 (Figure 1). It will be apparent therefore, that the chambers 35 and 102 are in constant communication, regardless of the positions of the parts of the apparatus as described below, and any pressures present in the motor chamber 35, as controlled by the valve mechanism in Figure 3, will be exactly duplicated in the motor chamber 102.

Suitable means is employed for insuring the returning of the parts of the apparatus to their "off" positions. For this reason, a coil spring 121 is preferably arranged in the motor chamber 103 and has its opposite ends engaging the head 12 and diaphragm plate 93.

The motor chambers 36 and 103 are maintained in communication with a source of relatively low pressure, as previously stated. For this purpose, the intake manifold is preferably employed as the source and since the chambers 36 and 103 are in fixed communication through the passages 101, either of the chambers is connected to the intake manifold. Such connection preferably is to the chamber 103 and for this purpose a suitable fitting 122 extends through the head 12 and is connected to a hose or pipe (not shown) leading to the intake manifold. The head 12 is preferably used for this purpose as indicated so that the connection from the intake manifold to the booster may be kept within the limits of the circumference of the casing 10, thus minimizing any chance of damage to the vacuum connection.

The operation of the apparatus is as follows:

The parts of the apparatus occupy the inoperative or "off" positions shown in Figure 1. When the vehicle brakes are to be applied, the operator depresses the brake pedal 24 to displace fluid from the master cylinder 23 through pipe 22 into the low pressure chamber 25. The ball 87 is unseated, as stated above, the rod 89 moving this ball from its seat 86 by engagement with the end of the cylinder 20.

Fluid flowing into the chamber 25 flowing through passages 85$^1$ and 85, around ball 87 and through passage 70 into the chamber 29 and thence through lines 30 to the brake cylinders. This flow of fluid takes place freely until the brake shoes of the wheels are brought into initial engagement with the drums. Thereafter, substantial resistance to the flow of the fluid occurs, and pressure in the fluid will increase throughout the system. Inasmuch as the area of the piston 70 exposed to the chamber 25 is greater than the area of the end of the piston rod 78 exposed to pressure in the chamber 29, the piston 70 will move toward the right, as viewed in Figure 1.

Figure 3:
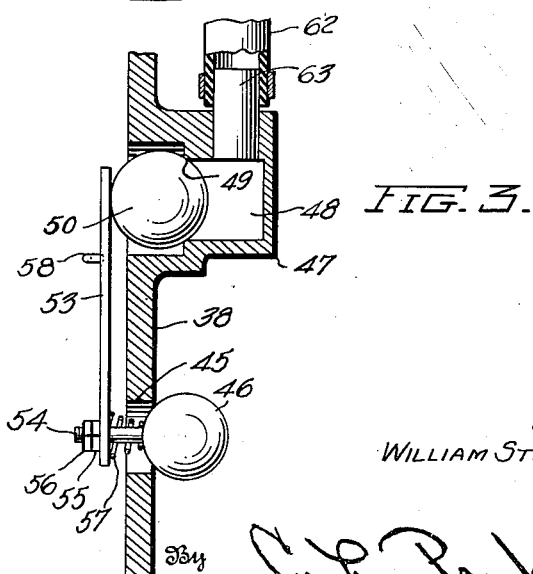
Figure 3 is an enlarged detail sectional view on line 3—3 of Figure 1.

Upon movement of the piston 70, the shoulder of the groove 71 will engage the lower end of the lever plate 53 and the end of this lever above the ball 65 will move toward the left, as viewed in Figures 1 and 3. Initial movement of the upper end of the lever will move the ball valve 46 to closed position, after which the ball 50 will be released by the lever to start to open. As previously stated, the motor chambers 36 and 103 are in constant communication with each other through passages 101, while the motor chamber 103 is connected to a source of relatively low pressure, preferably the intake manifold of the vehicle engine, through the fitting 122. When the valve 46 (Figure 3) is open, therefore, a partial vacuum will exist on both sides of the pressure responsive unit 34. The closing of this valve in the manner stated disconnects the motor chamber 35 from the source of vacuum and the opening of the valve 50 permits the flow of air through hose 62 and chamber 48 into the motor chamber 35, thus building up differential pressures on opposite sides of the pressure responsive unit 34.

The increase in pressure in the chamber 35 will be duplicated in the motor chamber 102 through ports 120, passage 106 and port 107. Differential pressures affecting the pressure responsive unit 34 therefore will be duplicated in the motor unit 33 to affect the pressure responsive unit 92. Both of the pressure responsive units being fixed to the piston sleeve 76, such sleeve will be moved toward the right in Figure 1 to move the plunger 77 and thus build up pressure in the chamber 29 to assist in applying the brakes.

The movement of the piston 70 toward the right in Figure 1 to operate the valve mechanism will be transmitted directly to the piston rod 78 and this rod will move together with the plunger 77 to assist in building up braking pressures in the chamber 29. Therefore, the operator performs part of the work in applying the brakes, the remainder of the work being performed by the two motor units. The proportion of the total work performed by the operator will, of course, depend upon the ratio between the areas of the plunger 77 and the adjacent end of the piston 78.

When movement of the brake pedal 24 is arrested, movement of the piston 70, and consequently of the piston rod 78, will be arrested. No more pressure will be built up in the chamber 29 by the operator, and no further movement will be transmitted to the lower end of the lever plate 53. A further slight additional movement of the pressure responsive unit 34 will result in the closing of the valve 50 to cut off the admission of air into the motor chambers 35 and 102.

Thereupon, the generation of pressure in the chamber 29 by the motor units will discontinue. If the closing of the valve 50 takes place with sufficient differential pressures present in the motor units to tend to move the plunger 77 to further increase pressure in the chamber 29, a very slight additional movement of the pressure responsive unit 34 will "crack" the valve 46 until the proper pressure differentials have been reached to maintain previously generated pressure in the chamber 29 without causing such pressure to increase, and this pressure will determine the degree of brake application.

When the pedal 24 is released, fluid will start to move from the brake lines 30 into the chamber 29 and from the chamber 25 back to the master cylinder. The piston 70 will move toward the left in Figure 1 to reverse the valve operation, the valve 50 being seated and the valve 46 being opened to exhaust air from the motor chamber 35, and from the motor chamber 102 through port 107, annular passage 106 and ports 120. Pressure equalization will be established in all of the motor chambers and the spring 121 will move the reciprocating parts back to their "off" positions.

It will be apparent that the present construction provides a dual or compound motor developing substantially double the power of a fluid pressure motor of equal diameter with a single pressure responsive unit therein. This is highly important in booster brake mechanisms for heavy vehicles, the space available for the booster motors preventing the use of a single motor of sufficient diameter to generate the necessary brake-applying power.

The two motor units are operable through a single simple valve mechanism, and all external piping connections for controlling one motor unit from the other are eliminated. All of the porting between the two motor units is arranged internally of the motor without the use of any protruding parts and, in fact, without the use of any additional parts except for the seal 112. This seal, in effect, is a part of the head 114 but its construction and use permit reciprocating movement of the pressure responsive unit 92 while maintaining a perfect seal between the motor units 36 and 102. Such seal is maintained without sliding or leaking connections of any kind.

The motor casing structure and its connection with the power diaphragms greatly simplifies the structure and renders it capable of highly economical manufacture. The cylinder casing 10 may be manufactured of sheet material rolled into cylindrical form and sealed along its edges, and the diaphragm-retaining beads 13 and 99 are easily formed by a simple rolling operation. Each diaphragm has its periphery maintained in its associated groove by the expansible force of the associated snap ring 42 or 100. When the device is in brake-applying operation, air pressure in each of the chambers 35 and 102 tends to maintain each diaphragm bead in proper position. Each diaphragm is so designed that the maximum travel of the associated pressure responsive unit can take place without exerting any pull on the diaphragm laterally of the groove in which the bead of the diaphragm is maintained. At the left hand end of the casing structure in Figure 1, the bead 13 forming the internal groove to receive the diaphram bead 41 is utilized in combination with the clamping band 15 to hold the head 11 fixed to the casing 10. The same simple securing means is used at the other end of the motor except that the bead 16 is not associated with a diaphragm.

I claim:

1. In a differential fluid pressure operated motor, a casing having end heads, a pair of spaced pressure responsive units in said casing, a rigid structure connecting said pressure responsive units and forming therewith a pressure-movable structure, a common head between said pressure responsive units to form two motor units each of which includes one of said pressure-responsive units with a pressure chamber within said casing on each side of each pressure responsive unit, said common head having an annular flexible portion secured to said rigid structure and being secured at its outer periphery to said casing and at its inner periphery to said rigid structure to seal the adjacent chambers of said casing from each other, said rigid structure having passages connecting each chamber of one motor unit to the corresponding chamber of the other motor unit, an axial cylinder connected to one of said end heads, a piston reciprocable in said cylinder and movable by fluid introduced thereinto, and a valve mechanism operable by said piston for controlling relative pressures in the chambers of one motor unit.

2. In a differential fluid pressure operated motor, a casing having end heads, a pair of spaced pressure responsive units in said casing, a rigid structure connecting said pressure responsive units and forming therewith a pressure-movable structure, a common head between said pressure responsive units to form two motor units each of which includes one of said pressure-responsive units with a pressure chamber within said casing on each side of each pressure responsive unit, said common head having an annular flexible portion secured to said rigid structure and being secured at its outer periphery to said casing and at its inner periphery to said rigid structure to seal the adjacent chambers of said casing from each other, said rigid structure having passages connecting each chamber of one motor unit to the corresponding chamber of the other motor unit, valve means carried by one of said pressure responsive units to control the relative pressures of the chambers on opposite sides thereof, a fluid chamber carried by one of said end heads, and a device in said fluid chamber movable by fluid introduced into said chamber and connected to said valve means to operate it.

3. In a differential fluid pressure operated motor, a casing having end heads, a pair of coaxial spaced pressure responsive units in said casing, a rigid member carried by one of said pressure responsive units coaxial therewith, a tubular member rigidly connecting said rigid member with the other pressure responsive unit whereby such units are fixed for simultaneous movement, and a common head between said pressure responsive units to form two motor units each of which includes one of said pressure responsive units with a pressure chamber on each side thereof, the interior of said tubular member having one end communicating with the chamber of one motor unit remote from the other motor unit and said rigid member having a passage connecting the interior of said tubular member to the corresponding chamber of said other motor unit, said rigid member having a passage therethrough connecting the remaining chambers of said motor units to each other.

4. In a differential fluid pressure operated motor, a casing having end heads, a pair of coaxial spaced pressure responsive units in said casing, a rigid member carried by one of said pressure responsive units coaxial therewith, a tubular member rigidly connecting said rigid member with the other pressure responsive unit whereby such units are fixed for simultaneous movement, a common head between said pressure responsive units to form two motor units each of which includes one of said pressure responsive units with a pressure chamber on each side thereof, the interior of said tubular member having one end communicating with the chamber of one motor unit remote from the other motor unit and said rigid member having a passage connecting the interior of said tubular member to the corresponding chamber of said other motor unit, said rigid member having a passage therethrough connecting the remaining chambers of said motor units to each other, and a valve mechanism for controlling relative pressures in the chambers of one of said motor units.

5. In a differential fluid pressure operated motor, a casing having end heads, a pair of coaxial spaced pressure responsive units in said casing, a rigid member carried by one of said pressure responsive units coaxial therewith, a tubular member rigidly connecting said rigid member with the other pressure responsive unit whereby such units are fixed for simultaneous movement, a common head between said pressure responsive units to form two motor units each of which includes one of said pressure responsive units with a pressure chamber on each side thereof, the interior of said tubular member having one end communicating with the chamber of one motor unit remote from the other motor unit and said rigid member having a passage connecting the interior of said tubular member to the corresponding chamber of said other motor unit, said rigid member having a passage therethrough connecting the remaining chambers of said motor units to each other, and a valve mechanism for controlling relative pressures in the chambers of one of said motor units, said common head having its radially outer portion connected to said casing and formed of relatively rigid material and its radially inner portion connected to said rigid member and formed of flexible material for the free axial movement of said rigid member with said pressure responsive units.

6. In a differential fluid pressure operated motor, a casing having end heads, a pair of spaced coaxial pressure responsive units in said casing each including a diaphragm secured at its outer periphery to said casing and a diaphragm plate secured at its outer periphery to the inner periphery of said diaphragm, a rigid member coaxial with said pressure responsive units and fixed to one of said diaphragm plates, a tubular member extending through and fixed to said rigid member and connected at one end to the other diaphragm plate, a common head between said pressure responsive units to form two motor units each of which includes one of said pressure responsive units with a pressure chamber on each side thereof, said common head comprising a wall having its outer periphery fixed to said casing and having a central opening coaxial with said rigid member, and a flexible seal having one end connected to said wall adjacent said opening and its other end connected to said rigid member to move therewith, one end of the interior of said tubular member communicating with the chamber of one motor unit remote from the other motor unit, said rigid member having a radial port connecting the corresponding chamber of the other motor unit to the interior of said tubular member, said rigid member having a longitudinal passage therethrough maintaining communication between the remaining chambers of said motor units, and a valve mechanism for controlling relative pressures in the chambers of one of said motor units.

7. In a differential fluid pressure operated motor, a casing having end heads, a pair of spaced coaxial pressure responsive units in said casing each including a diaphragm secured at its outer periphery to said casing and a diaphragm plate secured at its outer periphery to the inner periphery of said diaphragm, a rigid member coaxial with said pressure responsive units and fixed to one of said diaphragm plates, a tubular member extending through and fixed to said rigid member and connected at one end to the other diaphragm plate, a common head between said pressure responsive units to form two motor units each of which includes one of said pressure responsive units with a pressure chamber on each side thereof, said common head comprising a wall having its outer periphery fixed to said casing and having a central opening coaxial with said rigid member, and a flexible seal having one end connected to said wall adjacent said opening and its other end connected to said rigid member to move therewith, one end of the interior of said tubular member communicating with the chamber of one motor unit remote from the other motor unit, said rigid member having a radial port connecting the corresponding chamber of the other motor unit to the interior of said tubular member, said rigid member having a longitudinal passage therethrough maintaining communication between the remaining chambers of said motor units, one of said diaphragm plates having an opening therethrough to connect the chambers of the corresponding motor unit, a normally open valve controlling communication through said opening, a normally closed valve carried by said last mentioned diaphragm plate and controlling communication between one chamber of the corresponding motor unit and a source of higher pressure, and means for controlling the operation of said valves to first close the first mentioned valve and then open the second named valve.

WILLIAM STELZER.

REFERENCES CITED

The following references are of record in the file of this patent:

UNITED STATES PATENTS

| Number | Name | Date |
| --- | --- | --- |
| 1,801,560 | Knaak | Apr. 27, 1931 |
| 1,978,667 | Breese | Oct. 30, 1934 |
| 2,116,046 | Schmutz | May 3, 1938 |
| 2,220,902 | Hastings | Nov. 12, 1940 |
| 1,307,910 | Baade | Jan. 12, 1943 |
| 2,383,082 | Rossmann | Aug. 21, 1945 |
| 2,393,524 | Fant | Jan. 22, 1946 |
| 2,432,705 | Williams | Dec. 16, 1947 |

FOREIGN PATENTS

| Number | Country | Date |
| --- | --- | --- |
| 3,058 | Great Britain | Feb. 11, 1884 |